United States Patent [19]

Raber et al.

[11] 4,183,672
[45] Jan. 15, 1980

[54] OPTICAL INSPECTION SYSTEM EMPLOYING SPHERICAL MIRROR

[75] Inventors: Peter E. Raber, Milford, Conn.; Jason M. Gordon, Katonah, N.Y.

[73] Assignee: United Technologies Corporation, Hartford, Conn.

[21] Appl. No.: 855,116

[22] Filed: Nov. 26, 1977

[51] Int. Cl.$^2$ ............................................. G01B 11/24
[52] U.S. Cl. ....................................... 356/376; 356/4
[58] Field of Search ......................... 356/3, 4, 167, 376, 356/398

[56] References Cited

U.S. PATENT DOCUMENTS

| | | | |
|---|---|---|---|
| 3,246,561 | 4/1966 | Sweet | 356/209 |
| 3,282,149 | 11/1966 | Shaw et al. | 250/205 |
| 3,606,541 | 9/1971 | Sugano et al. | 356/167 |
| 3,667,846 | 6/1972 | Nater et al. | 356/156 |
| 3,986,774 | 10/1976 | Lowrey et al. | 356/167 |
| 4,040,738 | 8/1977 | Wagner | 356/1 |
| 4,062,623 | 12/1977 | Suzuki et al. | 356/120 |

*Primary Examiner*—John K. Corbin
*Assistant Examiner*—R. A. Rosenberger
*Attorney, Agent, or Firm*—Richard P. Lange

[57] ABSTRACT

An optical system having a spherical mirror is used to collect light from the surface of a turbine blade or the like which is to be contoured. The spherical mirror is located at an equal optical distance from both the test specimen and the linear diode array so that it operates at a one-to-one magnification ratio. The linear diode array is positioned behind the spherical mirror and it receives light focused by the mirror and reflected by a beam splitter through an opening in the center of the mirror. None of the optical elements of the inspection system are located in the plane of movement of the test specimen so that even particularly long items such as a helicopter rotor blade can be contoured. Identical upper and lower optical systems allows both surfaces of the test specimen to be contoured simultaneously and each system is independently operable and oriented to prevent optical interference. An automatic gain control is provided to adjust the optical modulator so that the effective intensity of the spot presented to the diode array is maintained within predetermined limits.

8 Claims, 3 Drawing Figures

OPTICAL INSPECTION SYSTEM EMPLOYING SPHERICAL MIRROR

BACKGROUND OF THE INVENTION

1. Field of the Invention

This invention relates to a contour measuring device and, more particularly, to an optical system used to view the surface of a test specimen, such as blades and vanes used in a turbine engine, during the contouring process.

2. Description of the Prior Art

The measurement of a complex surface by taking a successive series of cross-section measurements is generally known as "contouring". Knowing the precise shape of a complex surface can be particularly important where the surface is interacting with a fluid, and hence accurate contouring is a necessary prerequisite to the efficient design of blades and vanes used in a turbine engine. One such optical inspection system is disclosed in U.S. patent application No. 715,557 filed on Dec. 17, 1976 and assigned to the same assignee as the present application. In the embodiment disclosed in FIG. 2, a first and second pair of mirrors are spaced apart about the collecting axis; this axis also coincides with the plane in which the turbine blade is moved. A focusing lens is located between the first and second pair of mirrors along the collecting axis. A beam of light from a laser is directed to the surface of a blade. The pairs of planar mirrors collect light scattered from the spot on the surface of the turbine blade and, after focusing by the lens, present an imaged spot to the diode array. An imaged spot from both the upper and lower surface of the test specimen is presented to the diode array. Variation in the thickness of the turbine blade causes corresponding vertical movements of the light spots on opposite sides of the turbine blade, and this, in turn, results in a proportional deviation of the imaged spot on the linear diode array. By electrically interrogating the incremental elements of the diode array for each step of the movement of the beam across the blade cross section, an electrical signal indicative of the contour of the cross section is derived.

Another optical inspection system is disclosed in U.S. patent application No. 751,558 filed on Dec. 17, 1976, now abandoned, also assigned to the same assignee as the present invention. The optical inspection system described in this application employs a pair of parallel mirrors and a beam splitter which are used to view the incident light beam on the surface of the turbine blade from two different directions. The beam splitter optically combines light from separate paths thereby allowing a contour to be taken close to either shroud of the turbine blade without remounting the test specimen.

Another optical contouring device is disclosed in U.S. Pat. No. 3,782,287 issued to T. Neeson on Jan. 1, 1974. In this system a test specimen is moved under a beam of light and the reflected image passes through a beam splitter, an objective lens, and a pinhole aperture.

U.S. Pat. No. 3,909,131 issued to J. Waters on Sept. 30, 1975, also assigned to the same assignee as the present invention, describe a slightly different concept for surface gaging. A collimated light beam is focused on the test specimen and the light scattered therefrom is collected through a lens and presented to a detector via a folding mirror.

Other techniques and apparatus for contouring complex surfaces are described in U.S. Pat. No. 3,174,392 issued to K. Rantsch on Mar. 23, 1965, U.S. Pat. No. 3,975,102 issued to A. Rosenfeld on Aug. 17, 1976, U.S. Pat. No. 3,894,802 issued to P. Higgens on July 15, 1975, U.S. Pat. No. 3,918,816 issued to G. Foster on Nov. 11, 1975, U.S. Pat. No. 3,898,007 issued to K. Wiklund on Aug. 5, 1975 and U.S. Pat. No. 3,898,583 issued to D. Shuey on Aug. 5, 1975.

Many of the hereabove identified prior art systems which employ a coherent source of light such as a laser exhibit a condition known as "speckle" resulting in spatial variation of intensity across the beam incident on the test specimen. As a result, when the incident beam is projected onto a diode array, these intensity variations create a nonpredictable response, and this reduces spot resolution when the elements of the array are electrically interrogated.

Some prior art optical inspection systems have lenses or other optical elements which are located in the plane of movement of the test specimen. This can be a particular problem when the test specimen is very long, such as the main rotor blade of a helicopter or the like, since such "on axis" optical elements limit the length along the test specimen which can be contoured.

Still other prior art systems employed conventional low cost spherical lenses and located these elements either "on axis" or "off axis" to collect light scattered from the incident spot. The conventional low cost type of spherical lens most often used in such systems exhibits certain inherent aberrations. These abberations introduce optical errors into the measuring device which limit accuracy.

Another problem occurs in the type of system in which light is collected from both sides of a test specimen simultaneously and then the imaged spots are presented to a single diode array of the charged-coupled type. This problem results from the fact that these spots are close together when measuring thin portions of the specimen, such as near the forward or trailing edge of a turbine blade. As the result of electrical charge "spill over", adjacent diode elements erroneously appear to be receiving light from the focused spot and electrical interrogation of the elements of the diode array can render erroneous data concerning the thickness of the test specimen at that point.

In some prior art systems in order to measure the complete contour of a turbine blade it was necessary to move either the illuminating optics or the viewing optics, or both, with respect to the test specimen so that the incident axis and the collecting axis always cross at he surface of the test specimen. Inherently, the movement of the optical elements require very accurate mechanical parts which can provide a readout of the position of the changes in the axis crossings. These systems are expensive, slower and generally have lower accuracy than the type of system with fixedly mounted optical elements.

SUMMARY OF THE INVENTION

It is a primary object of the present invention to provide an improved optical inspection apparatus for use in the contour measuring of a test specimen in which the "speckle" problem is minimized.

According to the present invention, a spherical mirror having a one-to-one magnification ratio is employed to direct light scattered from an incident beam on the surface of a test specimen to a linear detector array. A beam splitter is disposed along the collecting axis between the incident spot and the spherical mirror to redirect the collected light through an opening in the center of the spherical mirror to a detector array situated behind the mirror.

According to the present invention, an optical measuring system is described which is particularly suitable for contouring the surface of a long test specimen, such as the main rotor of a helicopter or the like.

According to the present invention, an optical measuring system is described in which the optical pickup elements are particularly well suited for use with a coherent light source to minimize the speckle content inherent in such sources of electromagnetic radiation by the high collecting aperture of the spherical mirror operating at a one-to-one magnification ratio. The "speckle" is smoothed or averaged so that the spot of light presented to a detector array is relatively uniform in intensity across its diameter.

According to the present invention, an optical inspection system having two separate and independently operable pickup channels situated on either side of the test specimen is disclosed for contouring the surface thereof. This allows cross section to be taken on test specimens which have walls at either end thereof, such as a double shrouded turbine blade, without reversing the test specimen in the jig.

According to another aspect of the present invention, an optical inspection system is disclosed in which no movement of the optical elements or the detector array is required during the contouring process. A conventional rigid mounting technique can be employed to position the optical pickup elements and linear detector array resulting in a high degree of accuracy.

The foregoing, and other objects, features and advantages of the present invention will become more apparent in the light of the following detailed description of the illustrated embodiment as set forth in the accompanying drawing.

DESCRIPTION OF THE ILLUSTRATED EMBODIMENT

Figure 1:
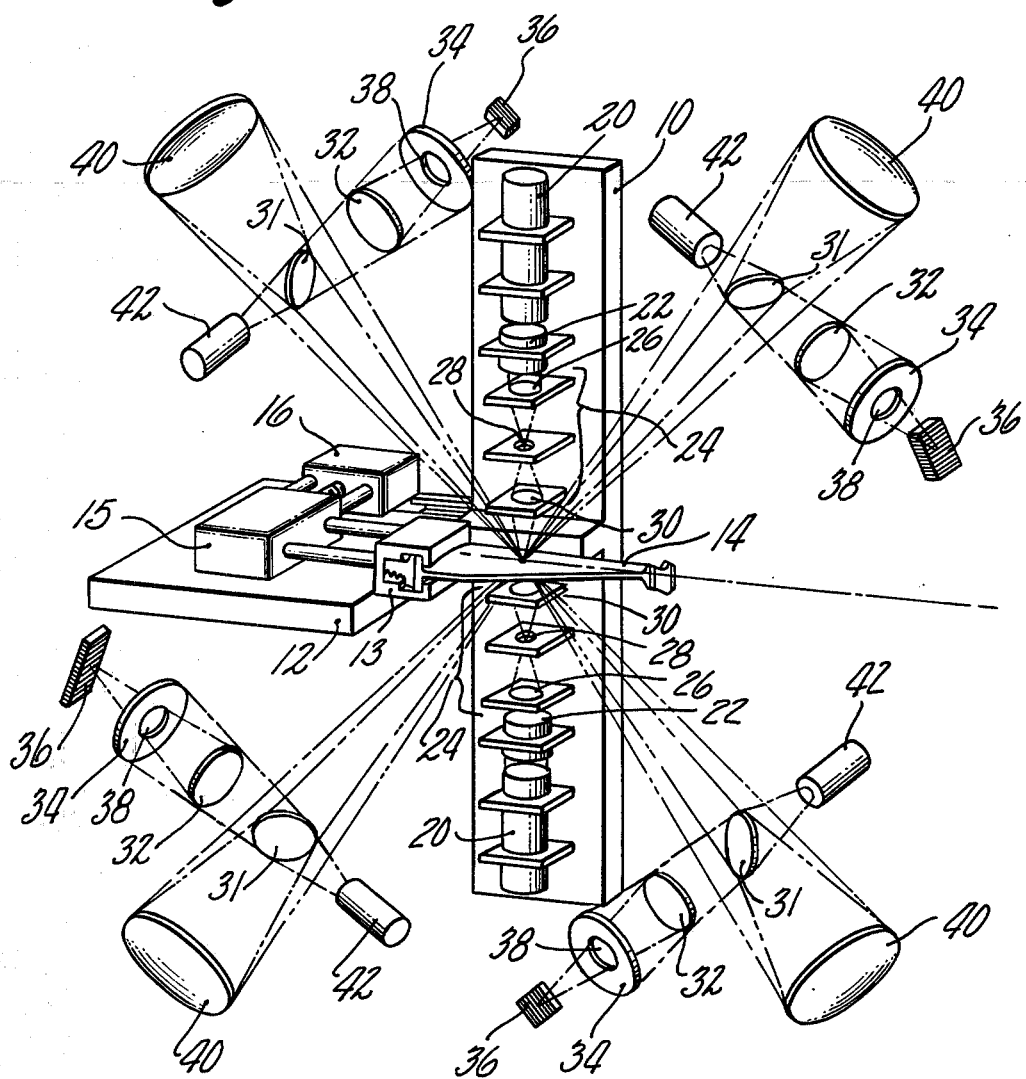
FIG. 1 is a simplified perspective view illustrating the major components of the inspection apparatus according to the present invention.

The major component parts of an optical inspection apparatus according to the present invention is illustrated in FIG. 1. Many of the mounting brackets that position the illustrated components have not been shown in the drawings for simplification since the structural details of these brackets would be apparent to those of ordinary skill.

As shown in FIG. 1, a base member 10 forms the main structural support element of the optical inspection appartus and a jig 12, fixedly attached thereto, grips one end of a turbine blade 14 with a jaw 13. The jaw 13 is adapted to be mechanically moved in two directions along a horizontal plane by motor-driven extenders 15 and 16 during the contouring process. The inspection apparatus includes an upper and lower surface contouring system, each adapted to operate separately and independently of the other so that both surfaces of the turbine blade can be contoured simultaneously. Each system includes a source of electromagnetic radiation, such as a laser 20, which is fixedly mounted to base member 10 so that it projects a beam of light toward the turbine blade 14 along an axis slightly skewed to the vertical. The significance of this alignment will be described in greater detail hereinafter. An optical modulator 22 is fixedly mounted to the base member 10 so that it receives the beam of light from the laser 20. From the optical modulator 22, the light beam in each system is presented to a spatial filter 24. Optical spatial filters are generally known and the embodiment of the present invention comprises a first lens 26, an aperture 28, and a second lens 30, all fixedly mounted on the base member 10 along the incident optical axis.

As indicated herebefore, the optical inspection apparatus according to the present invention includes two distinct systems for the simultaneous contouring of both the upper and lower surface of the turbine blade. In addition, each of the identical upper and lower systems has two pickup channels for viewing the surface of the turbine blade and the light scattered by the incident spot from a different direction. Each pickup channel has a separate collection axis so that the light spot is viewed from opposite sides of a vertical axis above the plane of movement of the turbine blade 14. Now referring additionally to FIG. 2, one of the four identical optical pickup channels is illustrated. Each pickup channel is adapted to receive light of "off axis" or at an angle which is oblique to the plane of movement of the turbine blade. This allows a turbine blade of any length to be contoured by the apparatus of the present invention in that there are no lenses or other optical parts situated along the plane of movement of the turbine blade which would otherwise restrict the lengthwise movement of long turbine blades. Each optical pickup channel comprises, in the order of location along the collecting axis, a planar mirror 31 mounted at a 45° angle to the collecting axis, a beam splitter 32 mounted normal to the collecting axis, a first spherical mirror 34 mounted normal to the collecting axis, and a detector array 36. The first spherical mirror has an aperture 38 therethrough along its axis and the detector array 36 is aligned therewith to receive light reflected from the backside of the beam splitter 32.

The optical elements used in the pickup channel according to the present invention provide a high optical accuracy for the resolution of variations in the surface contour of a turbine blade. This is, in part, achieved by employing a spherical mirror positioned in the collecting axis so that it has a one-to-one magnification ratio. Therefore, the optical distance from the light spot on the surface of the turbine blade 14 to the spherical mirror 34 is approximately equivalent to the optical distance from the firstd spherical mirror 34 to the linear detector array 36. In addition, the spherical mirror is sized to provide a high relative aperture (i.e. the ratio of focal distance to the optical diameter of the spherical mirror 34) so that the "speckle" problem with associated scattered light from a coherent light source is minimized.

Referring again primarily to FIG. 1, in operation the turbine blade 14 is first moved lengthwise by the actuator 15 to the point along its surface at which the chord measurement or cross section to be taken is aligned with the incident axis of the light source. Normally, only one pickup channel on each side of the test specimen is rendered operative to measure the curvature of the chord at a particular location. Accordingly, if the cross section location under inspection were at the left-hand end of the turbine blade 14, the right-hand pickup channel would be used to measure the chord and vice versa. Next, the turbine blade 14 is moved laterally by the actuator 16 in incremental steps and the detector array is interrogated at each step. Within certain limits, the displacement of the imaged spot on the detector array 36 is approximately equal to the displacement of the spot on the surface of the turbine blade due to the one-to-one magnification ratio of the spherical mirror 34. Since the linear detector array 36 is formed from a number of incremental photoresponsive elements arranged in a stacked configuration, the particular elements which receive the spot of light will be indicative of the vertical depth or thickness of the turbine blade at the particular point. Of course, as will be appreciated, in the event that the curvature and positioning of the spherical mirror 34 are such that it no longer has a one-to-one magnification ratio, the movement of the spot on the detector array 36 will be proportional to the particular magnification ratio used.

As a practical matter, it is not necessary that the turbine blade be stopped at each incremental step by the linear actuator 16 in measuring each cross section. This is because the linear detector array 36 can be electrically interrogated at a high rate so that the turbine blade appears essentially stationary during the interrogation period. In fact, it is contemplated that the entire process of moving the turbine blade 14 through a successive series of contouring sequences together with the interrogation and recordation of the readings on the linear detector array 36 would be under the control of a microprocessor or the like which would completely automate the inspection process but for the initial mounting of the turbine blade.

Figure 2:
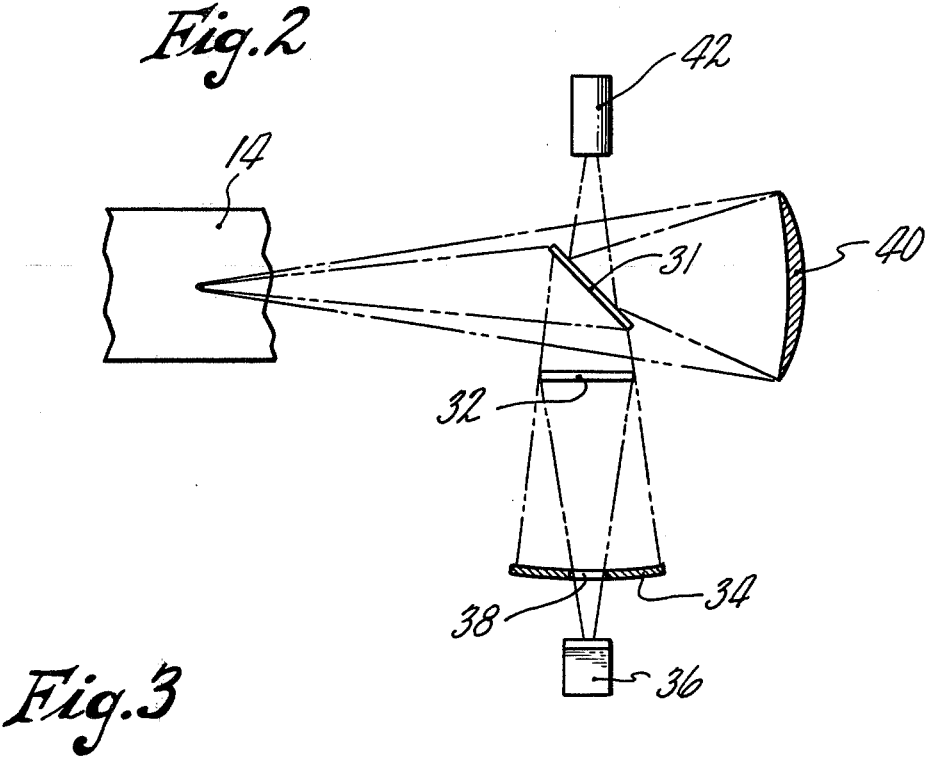
FIG. 2 is a top plan view of one pickup channel of the optical inspection apparatus according to the present invention; and, FIG. 3 is an enlarged front view of one of the light sources shown in FIG. 1 which is used to direct a narrow beam of light to the turbine blade.

A particular advantage of the optical system according to the present invention is that each pickup system gathers a relatively large amount of scattered electromagnetic energy along the same collecting axis as that used for contour measurement and presents this energy to an automatic gain control circuit for modulating the effective intensity of the spot incident on the surface of the turbine blade 14. This maintains the intensity of the spot incident on the detector array within determined limits. Referring primarily to FIG. 2, each optical pickup system preferably includes a second spherical mirror 40 disposed behind the planar mirror 31 and oriented normal to the collecting axis. The spherical mirror 40 gathers light from the spot on the surface of the turbine blade 14 along the same axis as that presented to the spherical mirror 34 but its cone contains only that light which is not incident on the mirror 31. This light is focused toward the photodiode 42 along a path which is folded by the backside of the mirror 31. The photodiode 42 together with known electrical circuitry (not shown) varies the control signal applied to the optical modulator 22 to adjust the effective intensity of the beam incident on the surface of the turbine blade 14. The spherical mirror 40 is sized and positioned with respect to the turbine blade 14 and the photodiode 42 to operate at preferably a magnification ratio of two-to-one. However, any magnification ratio of other than one-to-one could be employed to gather light and present it to a photoresponsive element. Of course, a beam splitter could be used in place of the mirror 31 which would result in the known light effeciency trade offs. If a beam splitter is used in place of the mirror 31, then the spherical mirror 40 can be operated at any magnification ratio.

Figure 3:
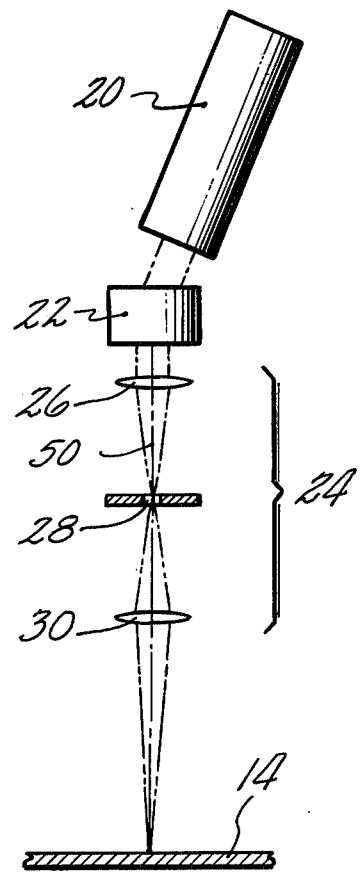

Referring now to FIG. 3, there is shown an enlarged view of a preferred embodiment of the source of electromagnetic radiation according to the present invention. As is seen, the incident axis 50 is essentially vertical so that the spot of light projected onto the turbine blade 14 strikes the surface in a circular pattern. The laser 20 is oriented so that it is slightly off axis to the incident axis 50 (shown exaggerated for purposes of illustration) and it cooperates with the spatial filter 24 to prevent a spot of light from reaching the surface of the turbine blade in the absence of a modulating signal. The optical modulator 22 is preferably of the acousto-optical type in which an acoustical driver (not shown) creates a wave front which diffracts the coherent light beam from the laser 20. In the present of a modulating signal, the modulator 22 redirects the collimated light beam along the incident axis 50 to the first lens 26 and the aperture 28. The pinhole size of the aperture 28 removes spurious noise and other interfering waveforms from the collimated electromagnetic beam and presents essentially a "clean" beam to the second lens 30 for focusing on the surface of the turbine blade.

The above embodiment is to be considered in all respects as merely illustrative and not restrictive. The scope of the invention is to be determined by the appended claims rather than by the foregoing description. It is intended that all changes in constructions which would come within the meaning and range of the equivalency of the claims are to be embraced therein.

Having thus described typical embodiments of our invention, that which we claim as new and desire to secure by Letters Patent of the United States is:

1. An optical system for use with apparatus for contouring the surface of a test specimen, comprising:
   jig means for moving said test specimen in a plane;
   source means for directing a beam of electromagnetic energy along an incident axis to the surface of said test specimen;
   beam splitter means situated along a collecting axis, and oriented normal thereto, at least a portion of said collecting axis being oblique to the plane in which the specimen is movable;
   spherical mirror means disposed normal to said collecting axis, and situated at an optical distance from the surface of said test specimen such that it operates at approximately a one-to-one magnification ratio, for focusing electromagnetic energy impinging thereon; and
   means disposed to receive electromagnetic energy from said spherical mirror for indicating the point relative to the plane of movement of the test specimen at which said beam of electromagnetic energy will intersect the surface of the test specimen.

2. An optical system according to claim 1, wherein said means disposed to electromagnetic energy is a detector array which is positioned along said collecting axis behind said spherical mirror, and wherein said spherical mirror includes an opening along the axis thereof so that the portion of said electromagnetic energy reflected from said beam splitter means is directed through said opening to said detector array.

3. An optical system according to claim 1, wherein said system is a part of two separately operable and identical contouring devices disposed to contour the opposite sides of a test specimen simultaneously.

4. An optical system according to claim 1, wherein each of said optical systems for inspecting the surface of a test specimen includes two pickup channels, the collection axis of each pickup channel being disposed on opposite sides of said incident axis.

5. An optical system according to claim 1, further including an automatic gain control device for receiving at least a portion of the electromagnetic energy directed along said collecting axis, for adjusting the effective intensity of the beam of electromagnetic energy from said source means.

6. An optical system according to claim 5, wherein a second beam splitter means is situated along said collection axis for dividing electromagnetic energy incident thereon into a first part and a second part, and wherein said spherical mirror means is oriented to receive said first part of said electromagnetic energy from said beam splitter means, and wherein said automatic gain control means receives said second part of said electromagnetic energy.

7. An optical system according to claim 6, wherein said automatic gain control further includes an optical element for focusing said second portion of said electromagnetic energy so that it is incident upon a photoresponsive element.

8. An optical system according to claim 1, wherein said source means comprises a coherent light source for radiating a beam of electromagnetic energy along an axis skewed to the incident axis, an optical modulator for receiving light from said coherent source and redirecting it along an incident axis in response to a control signal, a spatial filler means for removing spurious electromagnetic energy of the beam along an incident axis, and wherein said spatial filter means includes means for focusing said beam on said test specimen.

* * * * *

UNITED STATES PATENT AND TRADEMARK OFFICE
CERTIFICATE OF CORRECTION

PATENT NO. : 4,183,672
DATED : January 15, 1980
INVENTOR(S) : Peter E. Raber and Jason M. Gordon It is certified that error appears in the above-identified patent and that said Letters Patent are hereby corrected as shown below:

(1) Column 1, line 56    "3,782,287" should read --3,782,827--

(2) Column 1, line 56    "T. Neeson" should read -- Peter Nisenson et al --

(3) Column 2, line 51    "he" should read -- the --

Signed and Sealed this

First Day of July 1980

[SEAL]

Attest:

SIDNEY A. DIAMOND

Attesting Officer    Commissioner of Patents and Trademarks